(12) United States Patent
Young et al.

(10) Patent No.: US 9,346,539 B2
(45) Date of Patent: *May 24, 2016

(54) SELF-ORIENTING AIRCRAFT LANDING GEAR

(71) Applicant: Icon Aircraft, Inc., Los Angeles, CA (US)

(72) Inventors: Byron Young, Tehachapi, CA (US); Jon Karkow, Tehachapi, CA (US); Steen Strand, Santa Monica, CA (US)

(73) Assignee: Icon Aircraft, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,075

(22) Filed: Sep. 24, 2015

(65) Prior Publication Data

US 2016/0009382 A1 Jan. 14, 2016

Related U.S. Application Data

(63) Continuation of application No. 14/333,791, filed on Jul. 17, 2014, now Pat. No. 9,169,003.

(60) Provisional application No. 61/856,481, filed on Jul. 19, 2013.

(51) Int. Cl.
*B64C 25/50* (2006.01)
*B64C 25/36* (2006.01)

(52) U.S. Cl.
CPC .................. *B64C 25/36* (2013.01); *B64C 25/50* (2013.01)

(58) Field of Classification Search
CPC ...... B64C 25/405; B64C 25/40; B64C 25/36; B64C 25/18; B64C 25/20; B64C 25/12; B64C 25/02; B64C 25/04; B64C 25/06; B64C 2025/125; B64C 25/34; B64C 2025/345
USPC ...................... 244/103 R, 50, 104 R
See application file for complete search history.

(56) References Cited

U.S. PATENT DOCUMENTS

| | | | | | |
|---|---|---|---|---|---|
| 2,148,972 | A | * | 2/1939 | Waseige | B64C 25/20 244/102 R |
| 2,338,572 | A | * | 1/1944 | Corwin | B64C 25/50 192/56.1 |
| 2,346,010 | A | * | 4/1944 | Cowey | B64C 25/04 244/100 R |
| 2,371,699 | A | * | 3/1945 | Martin | B64C 25/14 244/102 A |
| 2,462,992 | A | * | 3/1949 | Parker | B64C 25/50 244/102 R |
| 2,478,729 | A | * | 8/1949 | Westcott, Jr. | B64C 25/20 244/102 SS |
| 2,481,635 | A | * | 9/1949 | Wheeler | B64C 25/20 244/102 R |
| 3,352,515 | A | * | 11/1967 | Albright | B64C 25/50 16/35 R |
| 4,556,179 | A | * | 12/1985 | Veaux | B64C 25/22 244/102 A |
| 4,634,082 | A | * | 1/1987 | Kendall | B64C 25/60 244/100 R |
| 4,907,761 | A | * | 3/1990 | Derrien | B64F 1/06 244/102 R |

(Continued)

*Primary Examiner* — Tien Dinh
*Assistant Examiner* — Assres H Woldemaryam
(74) *Attorney, Agent, or Firm* — Martensen IP (57) ABSTRACT

An aircraft landing gear self-orients so to align itself within a plane parallel to the plane defined by the aircraft's roll and yaw axis. A nose gear of a tricycle landing gear configuration includes the ability to not only caster 360 degrees but also self-orient itself to be aligned parallel with the plane defined by the aircraft's roll and yaw axis once removed from any interaction with the ground. A simple and efficient mechanical design provides the landing gear with a substantially constant centering torque that neither impedes nor impairs ground movement yet returns the nose gear to a proper alignment for retraction and stowage.

12 Claims, 5 Drawing Sheets

(56) References Cited

U.S. PATENT DOCUMENTS

| | | | |
|---|---|---|---|
| 4,984,755 A * | 1/1991 | Derrien | B64C 25/10 244/102 A |
| 5,029,775 A * | 7/1991 | Abramovitsh | B64C 25/20 244/102 A |
| 5,333,816 A * | 8/1994 | Del Monte | B64C 25/50 244/102 R |
| 7,708,225 B2 * | 5/2010 | Thulbon | B64C 25/50 244/102 SL |
| 8,523,106 B2 * | 9/2013 | Thompson | B64C 25/14 244/102 A |

* cited by examiner

SELF-ORIENTING AIRCRAFT LANDING GEAR

RELATED APPLICATION

The present application relates to and is a continuation of U.S. patent application Ser. No. 14/333,791 filed 17 Jul. 2014, which claims the benefit of priority to U.S. Provisional Patent Application No. 61/856,481 filed 19 Jul. 2013 both of which are hereby incorporated by reference in its entirety for all purposes as if fully set forth herein.

BACKGROUND OF THE INVENTION

1. Field of the Invention

Embodiments of the present invention relate to improvements in caster centering devices. Primarily devices for use in airplane landing gear to bring the nose wheel of the landing gear into parallelism with the fuselage of the plane, so that upon landing the caster wheel will be disposed in alignment with the direction of flight and upon retraction the landing gear is in alignment with the storage compartment.

2. Relevant Background

Aircraft landing gear, attached to primary structural members of the aircraft, support the entire weight of an aircraft during landing and ground operations. Most landing gear includes wheels to facilitate operation to and from hard surfaces, such as airport runways.

Numerous configurations of landing gear types can be found. Three basic arrangements of landing gear include: tail wheel-type landing gear, tandem landing gear, and tricycle-type landing gear. Tail wheel-type landing gear is generally comprised of a main gear assembly located forward of the center of gravity and an additional wheel assembly to support the tail. Alternatively, tandem landing gear has the main gear and tail gear aligned in the longitudinal axis of the aircraft. Sailplanes and certain large aircraft employ such a tandem configuration. In contrast, tricycle-type landing gear includes a main gear assembly and a nose gear.

The nose gear of some aircraft with tricycle-type landing gear is steerable from the flight deck via a nose wheel steering system. Conversely, other aircraft include nose wheel assemblies that caster (swivel freely in a horizontal plane). Such aircraft are steered during taxi by differential braking and use aerodynamic control surfaces during takeoff and landing to maintain directional control.

A further classification of aircraft landing gear can be made into two categories: fixed and retractable. Many small, single engine light aircraft have fixed landing gear, which means the gear is attached to the airframe and remains exposed to the slipstream as the aircraft is flown. However, as the speed of an aircraft increases, the drag caused by the fixed landing gear (parasite drag) also increases. To minimize parasite drag, mechanisms to retract and stow the landing gear are often employed. While in flight, retractable landing gear stows in the fuselage or wing compartment wheel wells. Once in these wheel wells, the landing gear is out of the slipstream and does not create any parasite drag.

Another category of aircraft that employ retractable landing gear is amphibians. Amphibious aircraft possess the ability to land and takeoff from the water as well as from land based runways. While the fundamentals of landing gear retraction and extension remain the same, the process must also consider the hydrodynamic forces and that the gear may be submerged for extended periods of time.

Presently, retractable aircraft landing gear that include a castering wheel assembly are susceptible to incorrect wheel orientation upon retraction assembly into the fuselage or wing storage compartment. If retracted in an improper position, the castering wheel assembly may not fit into the intended storage compartment and, consequently, doors to the landing gear storage compartment cannot close. Such a scenario can result in numerous problems, including breaking of one or more doors, stalling of one or more actuators, etc. And in the case of an amphibious aircraft an improperly retracted landing gear may result in unacceptable hydrodynamic performance that may jeopardize the ability to become safely airborne or safely land on water.

In light aircraft, especially Light Sport Aircraft or light amphibious aircraft, weight and complexity are driving design considerations. While landing gear centering mechanisms exist in the prior art they are, in many instances provide at the cost of increased weight and complexity. The challenge is therefore to produce a landing gear centering mechanism that is effective in orienting the landing gear prior to retraction and after extension and that is simple and minimizes financial and weight costs.

These and other challenges of the prior art are addressed by one or more embodiments of the present invention. That is to say, the present invention provides a simplified aircraft landing gear that self-orients and thus properly orients itself for storage within a storage compartment.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

An aircraft landing gear self-orients so as to align itself within a plane parallel to the plane defined by the aircraft's roll and yaw axis. In one embodiment of the present invention, a nose gear of a tricycle landing gear configuration includes the ability to not only caster 360 degrees without impediment but also self-orient itself to be aligned with the longitudinal axis (roll axis) of the aircraft once removed from any interaction with the ground. A simple and efficient mechanical design provides the landing gear with a substantially constant centering torque that neither impedes nor impairs ground movement, yet returns the nose gear to proper alignment for retraction and stowage.

According to one embodiment of the present invention, a self-orienting landing gear includes, a landing gear assembly, a wheel rotatably coupled to a wheel fork wherein the wheel fork is coupled to the landing gear assembly by a cylindrical shaft such that the wheel fork is able to caster about the longitudinal axis of the shaft, a cam associated with the wheel fork and circumscribing the cylindrical shaft wherein the cam possesses a planar modified cardioid shape having a top cam surface, a lower cam surface and a cam sidewall wherein the cam sidewall is substantially perpendicular to the upper cam surface and the lower cam surface, and a cam follower linked to the landing gear assembly and operable to continually engage the cam sidewall of the cam so as to create a substantially constant centering torque driving the cam follower to a cusp of the planar modified cardioid.

Other features of the self-orienting landing gear include that the wheel fork is operable to freely rotate 360 degrees about the longitudinal axis of the supporting shaft. Also the modified cardioid shape of the cam is designed such that a substantially constant applied force to the cam results in a constant centering torque regardless of the orientation of the wheel fork. The torque is maintained throughout the orientation of the wheel fork and cam until the cam follower arrives at the cusp of the cam at which point the resulting force is applied through the axis of rotation rendering the torque null. Another feature of the present invention is that the centering torque is consistent during ground, air and water operations. Also, torque is independent of whether the wheel is in contact with the ground or is suspended during airborne or seaborne operations.

According to another embodiment of the present invention, a landing gear centering mechanism for an aircraft that possesses a yaw axis, a pitch axis and a roll axis includes a wheel fork for a landing gear wheel wherein rotation of the wheel within the wheel fork defines a rotation plane, a wheel fork shaft coupling the wheel fork to a landing gear assembly wherein the wheel fork is operable to caster about a longitudinal axis substantially parallel to the yaw axis, a cam circumscribing the wheel fork shaft wherein the cam includes a modified cardioid shape, and a cam follower interposed between the cam and the landing gear assembly operable to generate, through contact with the cam, a centering torque about the longitudinal axis driving the rotation plane of the wheel to align with a pitch plane defined by the aircraft's roll axis and the aircraft's yaw axis.

Other features of the self-orienting landing gear of the present invention include that the modified cardioid cam includes two singularities. Moreover the cam can, in one instance, be fixed to the wheel fork, and in another instance, be fixed to the wheel fork shaft. The cam follower asserts a constant force against the sidewall of the cam so as to generate a centering torque about the longitudinal axis of the wheel fork shaft. In one embodiment this force is supplied by a gas spring, while in another embodiment a mechanical spring or similar device is used.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A self-orienting aircraft landing gear mechanism drives a castering landing gear to become aligned with the longitudinal axis of the aircraft prior to retraction/extension. According to one embodiment of the present invention, a cam and a cam follower is associated with the wheel fork assembly such that the cam and cam follower generate a substantially a centering torque about the castering axis such that upon removal of any frictional impediments, the wheel fork and its associated wheel are driven to be aligned with the longitudinal axis of the aircraft.

Embodiments of the present invention are hereafter described in detail with reference to the accompanying Figures. Although the invention has been described and illustrated with a certain degree of particularity, it is understood that the present disclosure has been made only by way of example and that those skilled in the art can resort to numerous changes in the combination and arrangement of parts without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Upon reading this disclosure, those of skill in the art will appreciate still additional alternative structural and functional designs for a self-orienting landing gear mechanism through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Figure 1:
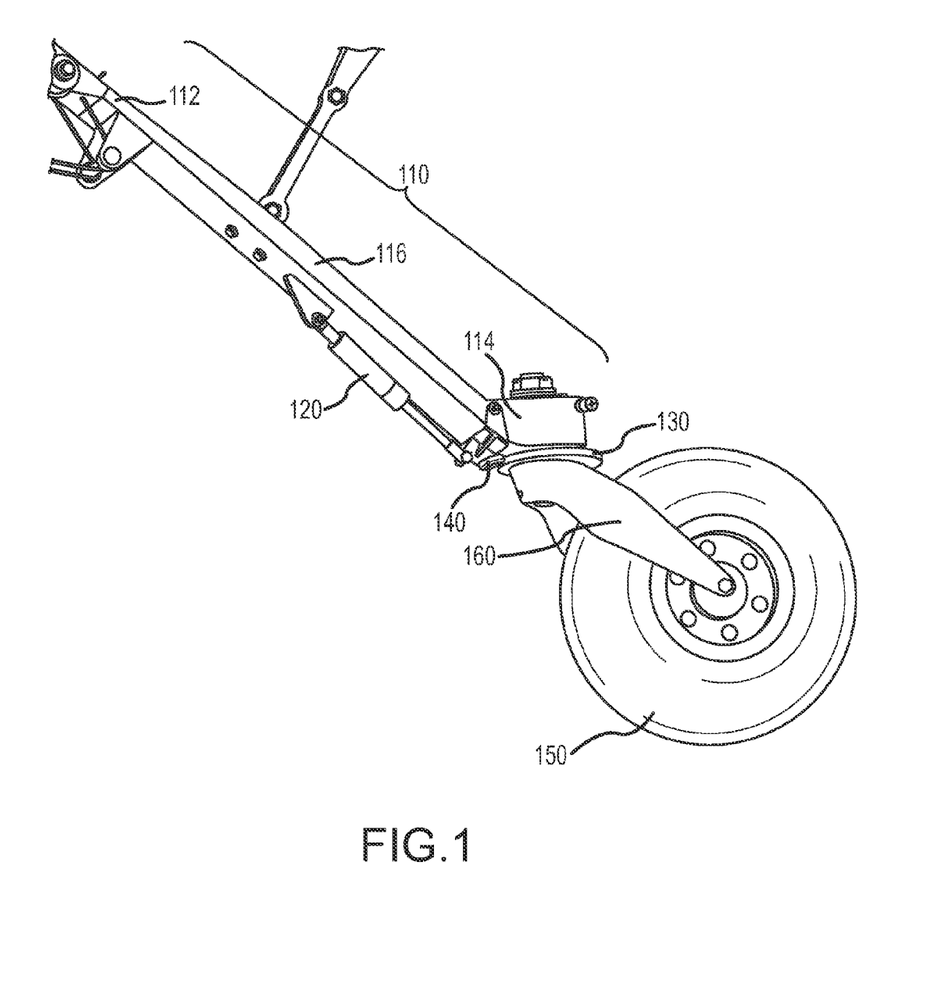
FIG. 1 shows a side view of a self-orienting landing gear according to one embodiment of the present invention.

A side perspective view of a self-orienting landing gear mechanism, in accordance with one embodiment of the present invention, is depicted in FIG. 1. As depicted, the self-orienting landing gear mechanism includes a landing gear assembly 110, a spring assembly 120, a cam 130, a cam follower 140, a castering wheel 150 and a castering wheel fork 160. In the present depiction, the landing gear assembly 110 includes an arm 116 and a wheel fork bracket 114. In this configuration forces transferred to the aircraft from landing will be mitigated by angularly deflecting the arm upward about a pivot point 112. In other embodiments, the castering wheel fork 160 can be coupled to a strut (not shown) in which the landing forces are vertically absorbed/mitigated prior to transference to the aircraft.

Figure 2:
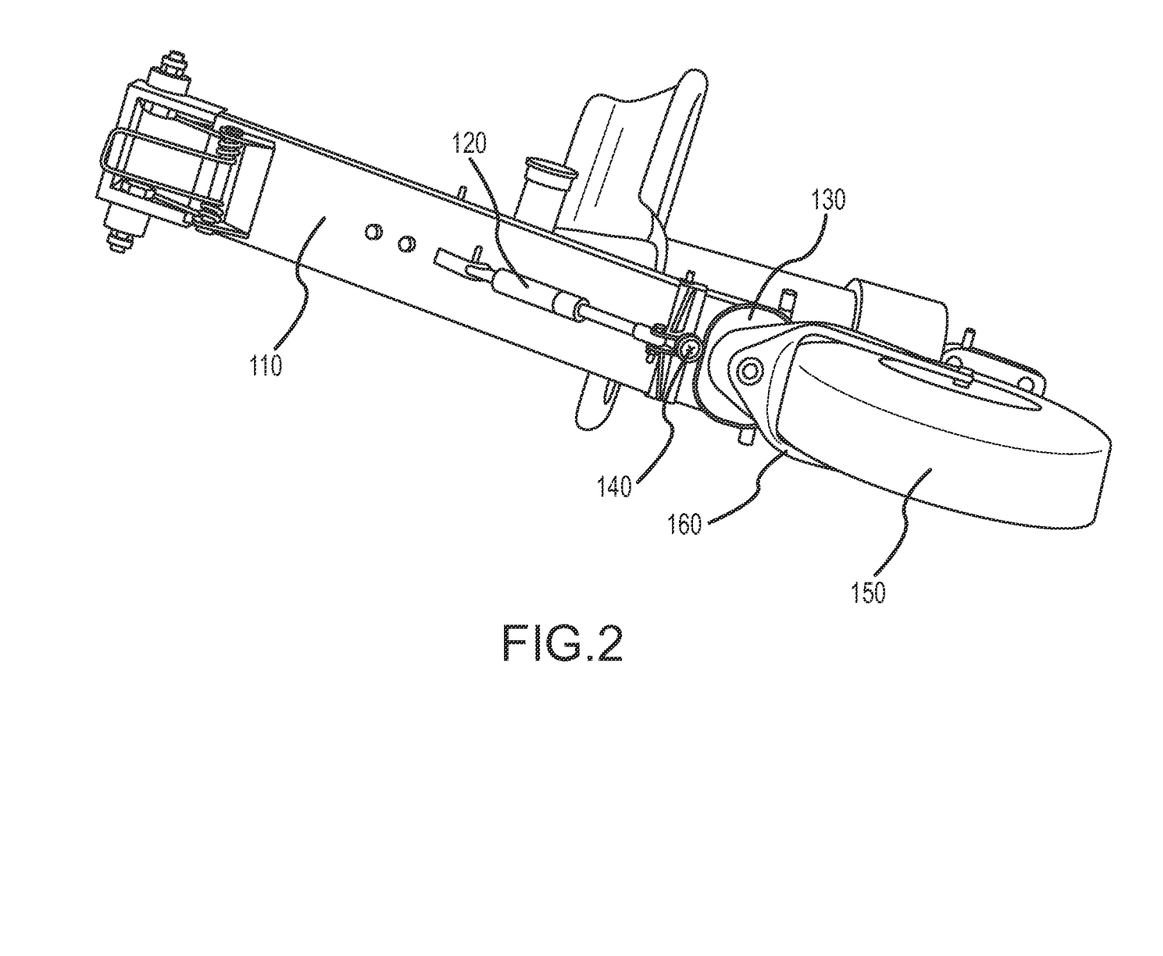
FIG. 2 shows a bottom view of a self-orienting landing gear according to one embodiment of the present invention.
Figure 3:
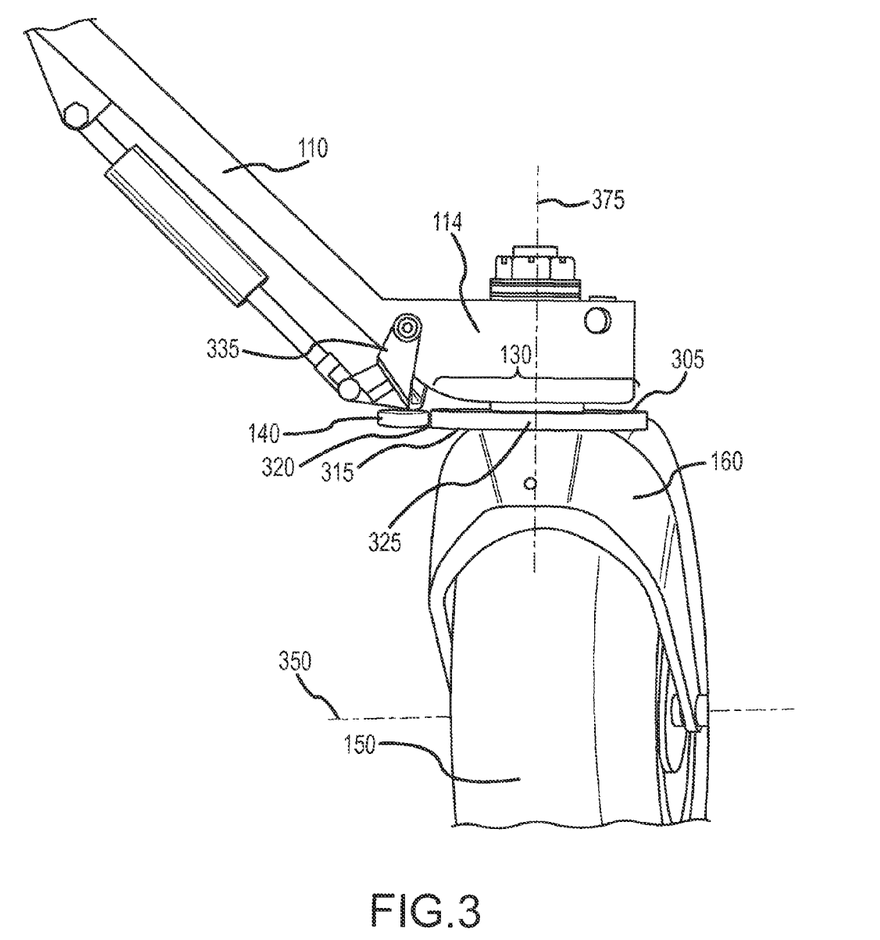
FIG. 3 shows a side view of a self-orienting landing gear according to one embodiment of the present invention wherein the wheel and wheel fork are rotated approximately 90 degrees from alignment with the landing gear's supporting structure.

FIG. 2 and FIG. 3 presents a bottom and side view, respectively, of one embodiment of the self-orienting landing gear mechanism of the present invention. Evident in FIG. 2 is the interaction between the cam follower 140 and the cam 130. Referring in addition to FIG. 3, the spring assembly exerts a linear force to a bracket that is in turn coupled to the cam follower 140. The cam follower is, in one embodiment, a rotatable wheel that presses against the sidewall of the cam 130. The force exerted from the cam follower 140 against the cam is not normal to the sidewall of the cam 130 and results in a tangential component. That is the force vector imposed on the cam by the cam follower does not pass through the cam's axis of rotation. A tangential component is realized as a centering torque on the wheel fork 160 driving the wheel fork and attached wheel 150 into alignment with the longitudinal axis of the aircraft.

As shown in FIG. 3 an exterior surface of the cam 130 is comprised of a top planar portion or surface 305 opposite a bottom planar portion or surface 315, and at least one sidewall portion 325 located substantially perpendicularly between the top planar portion 305 and the bottom planar portion 315. The top planar portion 305 of the cam 130 is adjacent to wheel fork bracket 114 of the landing gear assembly 110. The bottom planar portion 315 of the cam 130 is, in this embodiment, adjacent to the castering wheel fork 160. In other words, the cam 130 is interposed between the wheel fork bracket 114 of the landing gear assembly 110 and the castering wheel fork 160. In addition, the cam 130 circumscribes a central shaft axis 375 about which the wheel fork 160 and cam 130 rotate. Alternatively, the wheel fork 160 and cam 130 are affixed to a central shaft that rotates about the central shaft axis 375 within the wheel fork bracket 114. The wheel 150 is coupled to the wheel fork 160 via an axle aligned with a horizontal axis 350 that joins the distal ends of the wheel fork 160. Exemplary construction materials contemplated for cam 130 include but are not limited to anodized aluminum, anodized steel and other hardened or surface hardened material.

The cam follower 140 of the present invention comprises a substantially circular contour when in a horizontal position and includes a top wall portion opposite a bottom wall portion and at least one sidewall portion 320 located substantially perpendicular between the top wall portion and the bottom wall portion. The at least one sidewall portion 320 of the cam follower 140 is adjacent to and in contact with at least one sidewall portion 325 of a cam 130. According to one embodiment of the present invention, the top wall portion of the cam follower 140 is adjacent to a bracket 335 that conveys a constant force on the cam follower 140 to the cam 130 via the spring assembly 120. A sidewall portion 320 of a cam follower 140, in accordance with one embodiment of the present invention, which is adjacent to a sidewall portion 325 of a cam 130, has a circular shape, imparting a high point load at an interface between the cam follower 140 and the cam 130. Suitable constructions materials contemplated for cam follower 140 includes materials that provide for the transfer of frictional forces in a variety of environments and conditions and more over do not abrade the cam 130. An exemplary material for this purpose includes but is not limited to polyurethane and rubber.

Figure 4:
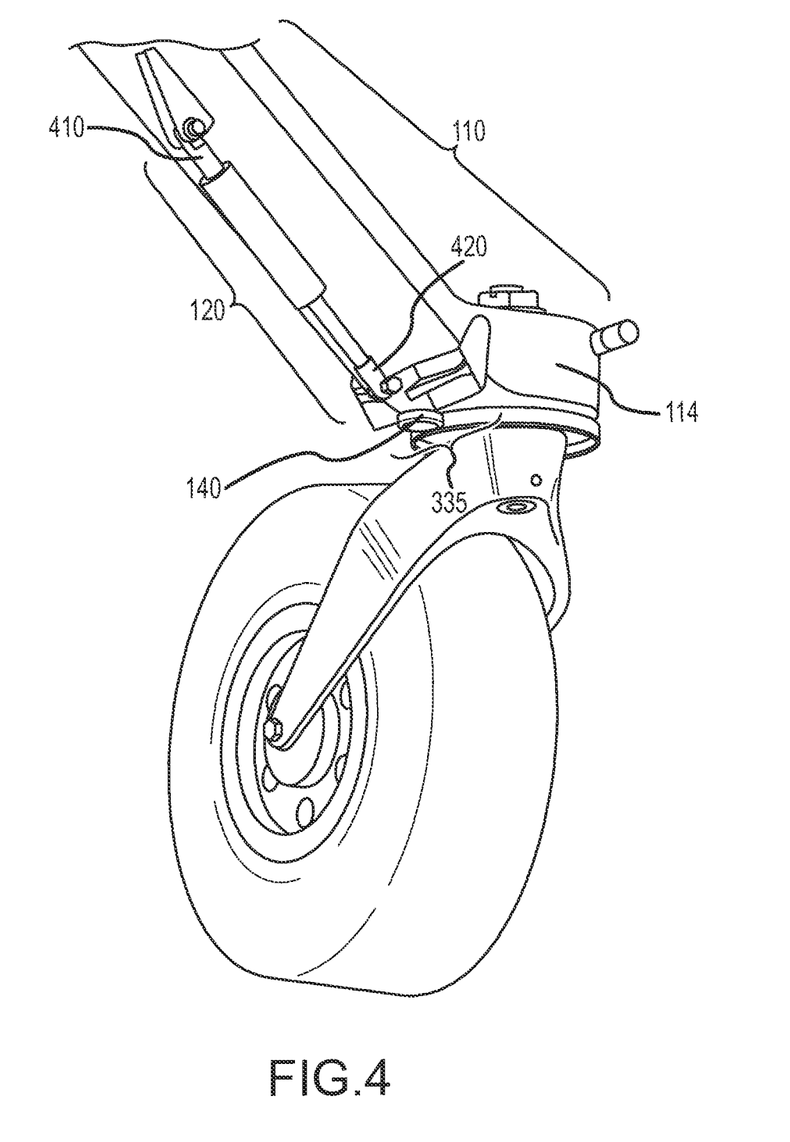
FIG. 4 shows a right forward perspective view of a self-orienting landing gear according to one embodiment of the present invention in which the wheel fork and wheel are rotated approximately 90 degrees from alignment with the landing gear's supporting structure.

The spring assembly 120, in accordance with one embodiment of the present invention, is shown in FIG. 4. The spring assembly 120 includes a first end portion 410 opposite a spring bracket 420 that couples the spring assembly 120 to the wheel fork bracket 114. A spring enclosed in a housing interposed between the first end portion 410 of the spring assembly 120 and the spring bracket 420 of the spring assembly 120 drives the cam follower 140 against the cam 130. According to one embodiment of the present invention, a spring assembly 120 is directly coupled with a cam follower 140 without utilization of a bracket. An exemplary spring assembly 120, according to one embodiment of the present invention, includes a gas spring (for example but not limited to an air spring) and other designs that can provide a substantially constant force in a variety of environmental conditions. Exemplary materials contemplated for spring construction include but are not limited to anodized aluminum and anodized steel.

According to one embodiment of the present invention, the correct orientation of a castering wheel upon retraction of a castering wheel assembly into the fuselage or wing storage compartment is rearward facing. When the castering wheel assembly is retracted with the castering wheel in a rearward facing position, the castering wheel assembly does not interfere with the storage compartment and landing gear linkage and, thus, is properly stored.

The castering wheel assembly of the present invention is self-orienting due to the production of a substantially a constant torque about a vertical axis 375. In an exemplary embodiment of the present invention, the castering wheel is self-oriented in a rearward facing position by a mechanism (spring) applying force to a cam follower that, in turn, applies force to a modified cardioid shaped cam. The cam comprises an outer contour with a propensity to orient in a specific position in response to force.

Figure 5:
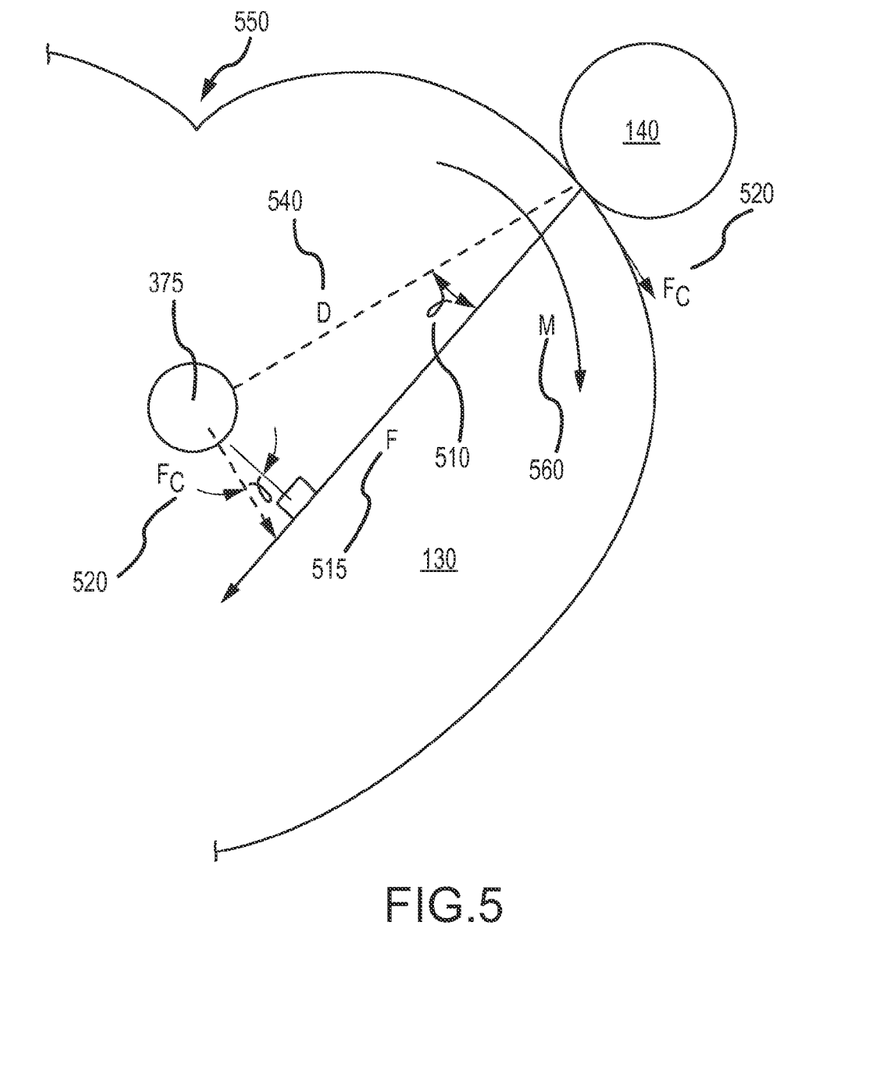
FIG. 5 is a top graphical view of a cam and cam follower and showing the resolution of forces imposed on the cam by the cam follower according to one embodiment of the present invention.

As one of reasonable skill will appreciate and with additional reference to FIG. 5, the force F 515 produced by the cam follower 140 on the cam 130 when the wheel is not rearward oriented is not focused through the central axis 375. Rather the force F 515 placed on the cam 140 is slightly offset from the central axis 375 of rotation based on the geometry of the cam 130. This angular offset a 510 varies throughout the shape of the cam but consistently produces a centering force $F_c$ 520 acting perpendicular to a line D 540 running from the point of contact to the axis of rotation 375 and which drives the cam follower 140 to the cusp 550 of the cam 130. As one of reasonable skill in the art will recognize, this force $F_c$ 520 acting at a distance D 540 creates a moment (torque) M 560. At the cusp 550 the centering force F 510 acts through the central axis 375 eliminating any torque. Directly opposite the cusp 550 on the cam exists another point at which the force F 510 would act directly through the central axis 375. However while the cusp is designed to be statically and dynamically stable, the opposite side of the cam is statically and dynamically unstable. Recall that a torque or moment M 560 is a normal force multiplied by the distance from the point at which it acts. In this case, the centering force $F_c$ 520 acts on the central axis 375 from a distance D 540 from the central axis 375 to the point of contact of the cam 140. According to one embodiment of the present invention the shape of the cam 130 is designed to provide a substantially constant centering torque about the central axis 375 so as to consistently drive the wheel fork (and wheel) into a rearward alignment.

At each point of contact between the cam follower and cam the angular offset α from the central axis changes. So too does the distance between the central axis and the point of contact. As the force applied to the cam by the cam follower is substantially constant, the product of the force, the sin of the angular difference and distance from the central axis to the point of contact is the same. This relationship, and mechanical constraints, drives the shape of the cam.

In accordance with one embodiment, an exemplary outer contour shape of a cam of the present invention as viewed from a bottom perspective is substantially heart-shaped or a modified cardioid. A perfect cardioid shape would also produce a centering torque but would, with a substantially constant applied force, be variable. Thus in the designs of the prior art a centering mechanism engaging a cam is disconnected or rendered inoperable during ground operations. The introduction of a variable steering torque would render ground maneuverings more difficult. By contrast the present invention provides a consistent torque or tendency for the nose gear to be aligned with the longitudinal axis of the aircraft. This enables not only consistent handling characteristics during ground operations, but also a simplified and more efficient design to return the nose gear into alignment with the longitudinal axis of the aircraft for gear retraction and extension. The simplified design is less costly to produce both in the sense of weight and finances.

In one embodiment of the present invention the self-centering mechanism is implemented on an amphibious aircraft. In such an embodiment the aircraft may be placed into service from a boat ramp or similar land/water interface. In one instance, the aircraft may, under its own power, taxi from a ground environment to a seaborne environment. As the aircraft becomes seaborne and the landing gear is no longer in contact with the ground the pilot may retract the gear to minimize hydrodynamic drag and prepare the aircraft for takeoff. In such an instance the landing gear (nose gear) will self-orient so as to be aligned with the longitudinal axis of the aircraft. Said differently the plane in which the nose gear rotates during retraction will be parallel with the plane defined by the roll and yaw axis of the aircraft.

An amphibious aircraft may also be manually launched into a seaborne condition. In such an instance the aircraft can be configured for land operations but be positioned using ground equipment or ground personnel. For example, the aircraft can be towed or maneuvered to a boat ramp manually and backed into the water much like a boat would be launched from a trailer. However, in this instance the aircraft would be supported by its own landing gear. In such an instance the nose gear would caster 360 degrees to assist in maneuverability of the aircraft on the ground. As the aircraft is backed into the water the nose gear would likely be oriented forward or 180 degrees from its normal position. As the aircraft becomes afloat and the gear is no longer in contact with the ground, the centering torque drives the wheel to its aligned position so that is can be safely retracted and stowed.

While there have been described above the principles of the present invention in conjunction with a self-orienting aircraft landing gear, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel features or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for self-orienting an aircraft landing gear, comprising: coupling a wheel mount with a landing gear assembly via a cylindrical shaft wherein the wheel mount is configured to caster about a longitudinal axis of the cylindrical shaft;
   circumscribing the cylindrical shaft with a cam wherein the cam possesses a planar cardioid shape having a top cam surface, a lower cam surface and a cam sidewall wherein the cam sidewall is substantially perpendicular to the upper cam surface and the lower cam surface;
   continually engaging the cam sidewall by a cam follower; and creating, by the cam follower, a substantially constant centering torque driving the cam follower to a cusp of the planar cardioid.

2. The method of claim 1, wherein the cusp of the planar cardioid is aligned with a longitudinal axis of an aircraft.

3. The method of claim 1, wherein the substantially constant centering torque is consistent during ground, air and water operations.

4. The method of claim 1, wherein the substantially constant centering torque is independent of whether the wheel is in ground contact, airborne or seaborne.

5. A system for centering landing gear of an aircraft wherein the aircraft possesses a yaw axis, a pitch axis and a roll axis, the system comprising:
   a wheel mount rotatably coupled to a landing gear wheel wherein rotation of the landing gear wheel defines a rotation plane;
   a shaft aligned with a longitudinal axis substantially parallel to the yaw axis and coupling the wheel mount to the aircraft wherein the wheel mount caster about the longitudinal axis;
   a cam circumscribing the shaft wherein the cam includes a cardioid shape; and
   a cam follower interposed between the cam and aircraft and operable to generate, through continual contact with the cam, a centering torque about the longitudinal axis driving the rotation plane of the wheel to align with a pitch plane defined by the roll axis and the yaw axis.

6. The system of claim 5, wherein the cardioid shape includes two singularities.

7. The system of claim 5, wherein the wheel mount is fixed to the cam.

8. The system of claim 5, wherein the shaft is fixed to the cam.

9. The system of claim 5, wherein the cam follower asserts a force against a sidewall of the cam generating the centering torque.

10. The system of claim 5, wherein the cardioid shape includes at least one singularity and responsive to the cam follower being in contact with the at least one singularity, the rotation plane of the wheel is parallel with the pitch plane of the aircraft.

11. The system of claim 5, wherein the centering torque is consistent during ground, air and water operations.

12. The system of claim 5, wherein the centering torque is independent of whether the wheel is in ground contact, airborne or seaborne.

* * * * *